United States Patent [19]
Johnson et al.

[11] 3,969,739
[45] July 13, 1976

[54] EXPOSURE CONTROL SYSTEM WITH SELECTIVELY PRESENTABLE INERTIA MEMBER

[75] Inventors: Bruce K. Johnson, Andover; Donald G. Josephson, Medford; George D. Whiteside, Lexington, all of Mass.

[73] Assignee: Polaroid Corporation, Cambridge, Mass.

[22] Filed: May 27, 1975

[21] Appl. No.: 581,112

[52] U.S. Cl. .............................. 354/230; 354/246; 354/256
[51] Int. Cl.² ....................... G03B 9/00; G03B 9/24
[58] Field of Search ............... 354/26, 29, 30, 226, 354/228, 229, 230, 234, 235, 256, 259, 260

[56] References Cited
UNITED STATES PATENTS

| | | |
|---|---|---|
| 3,251,288 | 5/1966 | Kitai ..................... 354/259 |
| 3,587,434 | 6/1971 | Ort........................ 354/256 |
| 3,722,392 | 3/1973 | Kitai ................... 354/259 X |
| 3,856,393 | 12/1974 | Ogitara et al. ........... 354/230 X |
| 3,873,987 | 3/1975 | Brauning et al. ................ 354/256 |

Primary Examiner—Joseph F. Peters, Jr.
Attorney, Agent, or Firm—Edward S. Roman

[57] ABSTRACT

An exposure control system for photographic apparatus is provided with an inertial member, the inertia characteristic of which may be selectively presented for movement in correspondence with the shutter blade elements of the exposure control system. The inertial member is arranged to move in correspondence with the shutter blade elements to control the rate of movement of the shutter blade elements toward their maximum aperture defining position. Conversely, return movement of the shutter blade elements toward their closed position operates to disengage the inertial member therefrom so as to allow the shutter blade elements to be quickly closed without the influence of the inertia characteristic. The inertial member is thereafter automatically returned to its initial position in readiness for subsequent movement in correspondence with the shutter blade elements upon the next photographic cycle.

19 Claims, 7 Drawing Figures

EXPOSURE CONTROL SYSTEM WITH SELECTIVELY PRESENTABLE INERTIA MEMBER

BACKGROUND OF THE INVENTION

1. Field of the Invention

This invention relates generally to an exposure control system with inertia means for a photographic apparatus and more particularly to an exposure control system with a selectively presentable inertia characteristic for more precisely controlling the rate of effective aperture opening in a photographic apparatus.

2. Description of the Prior Art

Exposure control systems for photographic apparatus conventionally embody light weight shutter blade elements with scene light admitting apertures therethrough. Shutter blade elements of this type may be moved in directions which operate to progressively enlarge and decrease the effective scene light admitting aperture that is defined by the overlapping scene light admitting apertures. The rate at which the blade elements are moved determines the rate at which the effective aperture decreases and increases, and has a direct influence on the achievable depth of field. Thus, in order to increase the depth of field, it is desirable to precisely control the speed of the shutter blade elements as they are moved in the direction of progressively increasing effective aperture size. Such shutter blade elements are often moved toward the open position through the influence of a biasing spring, the output force characteristic of which controls the speed at which the shutter blade elements move. For exposure control systems embodying light weight shutter blade elements as well as other moving components, it is necessary to utilize a substantially light biasing spring to achieve the desired slow rate of shutter blade opening. However, in such a light weight exposure control system of the above-described type where the actuating force is small, the frictional forces between moving components becomes a significant part of the overall force which must be overcome by the biasing means. These frictional forces also tend to vary with shutter blade movement and thus cause a jerking movement of the shutter blades which is highly undesirable. An increase in the output force characteristic of the biasing spring by itself may make the opening movement of the shutter blade elements less sensitive to frictional force variations; however, the increased shutter blade speed will also limit the depth of field which could otherwise be achieved.

Other difficulties associated with exposure control systems of the above-described type may arise as a result of the shutter blade elements reaching their maximum effective aperture defining position and abruptly stopping. This abrupt stopping of the shutter blade elements may result in jarring or bouncing which would have a distorting effect upon the actual scene light pinging upon the film plane. The same problem may also arise when the shutter blade elements are returned to their closed position and then abruptly stopped so as to jar or bounce the individual shutter blade elements.

Therefore, it is a primary object of this invention to provide an exposure control system for a photographic apparatus wherein the rate of aperture opening may be uniformly determined without effecting the fast rate of aperture closing. The concept of an inertially influenced exposure control system to overcome the above described problems is disclosed in an application for U.S. Patent entitled "Inertial Means For Exposure Control System" by George D. Whiteside and Bruce K. Johnson, Ser. No. 574,695 filed May 5, 1975, in common assignment herewith.

Therefore, it is another primary object of this invention to provide an improved exposure control system of the above-described inertially influenced type.

It is also an object of this invention to provide an exposure control system featuring a pair of movable shutter blade elements having respective light admitting apertures therethrough which overlap in a manner defining an effective aperture wherein shutter blade movement toward an effective open aperture may be determined at a uniform rate without effecting the rapid closing of the shutter blade elements.

It is a further object of this invention to provide an exposure control system for photographic apparatus of the type featuring at least a pair of shutter blade elements having respective light-admitting apertures therethrough which overlap to define an effective aperture wherein the shutter blade elements may be moved to their maximum effective aperture defining position and stopped thereat without jarring or bouncing the individual shutter blade elements.

It is another object of this invention to provide an exposure control system for a photographic apparatus wherein the exposure control system is of the type embodying at least a pair of shutter blade elements movable in correspondence with each other by a walking beam wherein means are included for selectively presenting an inertia characteristic to the walking beam when moved from its light blocking position to a maximum effective aperture defining position.

It is an additional object of this invention to provide an exposure control system for a photographic apparatus wherein the various components of the exposure control system are automatically returned to their initial position in readiness for the commencement of a subsequent photographic cycle without jarring or bouncing the individual components of the exposure control system.

Other objects of the invention will in part be obvious and will in part appear hereinafter. The invention accordingly comprises the mechanism and system possessing the construction combination of elements and arrangement of parts which are simplified in the following detailed disclosure.

SUMMARY OF THE INVENTION

The invention herein described and claimed relates to an exposure control system and mechanism for a photographic camera apparatus of the type defining a film plane and including a housing and an objective lens mounted on the housing. The exposure control system includes blade means together with means for selectively moving the blade means between a first arrangement wherein the blade means precludes scene light from reaching the film plane and a second arrangement wherein the blade means defines a maximum aperture size through which the scene light may reach the film plane. The blade means also serves to define a range of progressively increasing sized apertures as it moves from its first arrangement to its second arrangement. There are also included means for presenting a relatively high inertia characteristic to the moving means as the moving means moves the blade elements from its first arrangement toward its second arrangement to impart a slower aperture opening movement to the blade means than would otherwise occur. The presenting means also operates to automatically present a relatively low inertia characteristic to the moving means as the moving means moves the blade means away from its second arrangement towards its first arrangement, in this manner allowing aperture closing movement of the blade means substantially uninhibited by the high inertia characteristic. The inertia characteristic presenting means also operates to automatically present the relatively high inertia characteristic to the moving means whenever the moving means is again caused to move the blade means from its first arrangement to its second arrangement.

The moving means includes a rotatably mounted member arranged to be rotated in a first direction as the moving means moves the blade means from its first arrangement to its second arrangement and to be rotated in the opposing direction as the moving means moves the blade means from its second arrangement to its first arrangement. The inertia characteristic presenting means also includes an inertial member mounted for rotation in correspondence with the moving means member. Means for rotatably mounting the moving means member with respect to the inertial member include concentric shaft portions extending respectively from the moving means member and the inertial member wherein the shaft portions are journalled for rotation with respect to each other and additionally include support means for journalling only the inside concentric shaft portion for rotation about a select axis with respect to the camera housing.

The moving means and inertial member may also be mounted to accommodate limited displacement along their axis of rotation while at the same time being biased to move against one of the limits of displacement along their axis of rotation. There may further be included means for interrupting rotation of the inertial member and moving means member upon reaching the position corresponding to the second arrangement in a manner operating to urge the inertial member against the bias of the biasing means to absorb the rotational momentum of the inertial member and moving means member in a gradual manner without substantially bouncing the moving means member.

In addition, there may also be included means for causing the inertial member to return to its initial position subsequent to the moving means member returning to its position corresponding with the first arrangement. Stop means may also be provided for intercepting the inertial member upon the return of the inertial member to its initial position so as to prohibit the inertial member from engaging and bouncing the moving means member. There may also be provided latch means for selective engagement with the inertial member in order to prohibit substantial displacement of the inertial member from its initial position. In this manner, the inertial member can engage the moving means member and retain the moving means member in its position corresponding to the first arrangement in order to maintain the blade elements in a position entirely precluding scene light from reaching the film plane regardless of the operative status of the moving means.

BRIEF DESCRIPTION OF THE DRAWINGS

The novel features that are considered characteristic of the invention are set forth with particularity in the appended claims. The invention itself, however, both to its organization and its method of operation, together with other objects and advantages thereof, will be best understood from the following description of the illustrated embodiment or when read in connection with the accompanying drawings or when like members have been employed in the different figures to note the same parts and wherein:

DESCRIPTION OF THE PREFERRED EMBODIMENT

Figure 1:
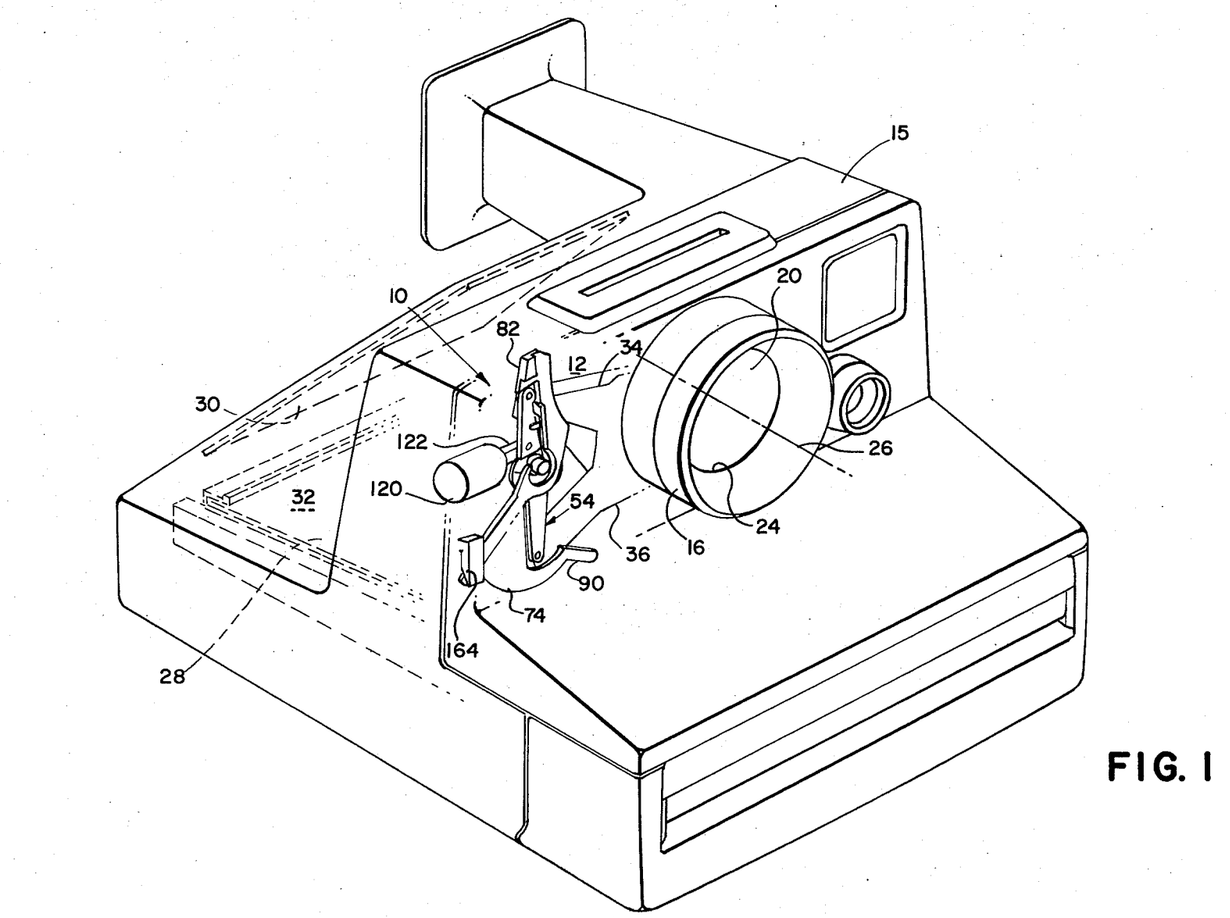
FIG. 1 is a partially cutaway perspective view of a camera apparatus embodying the exposure control system of this invention.
Figure 2:
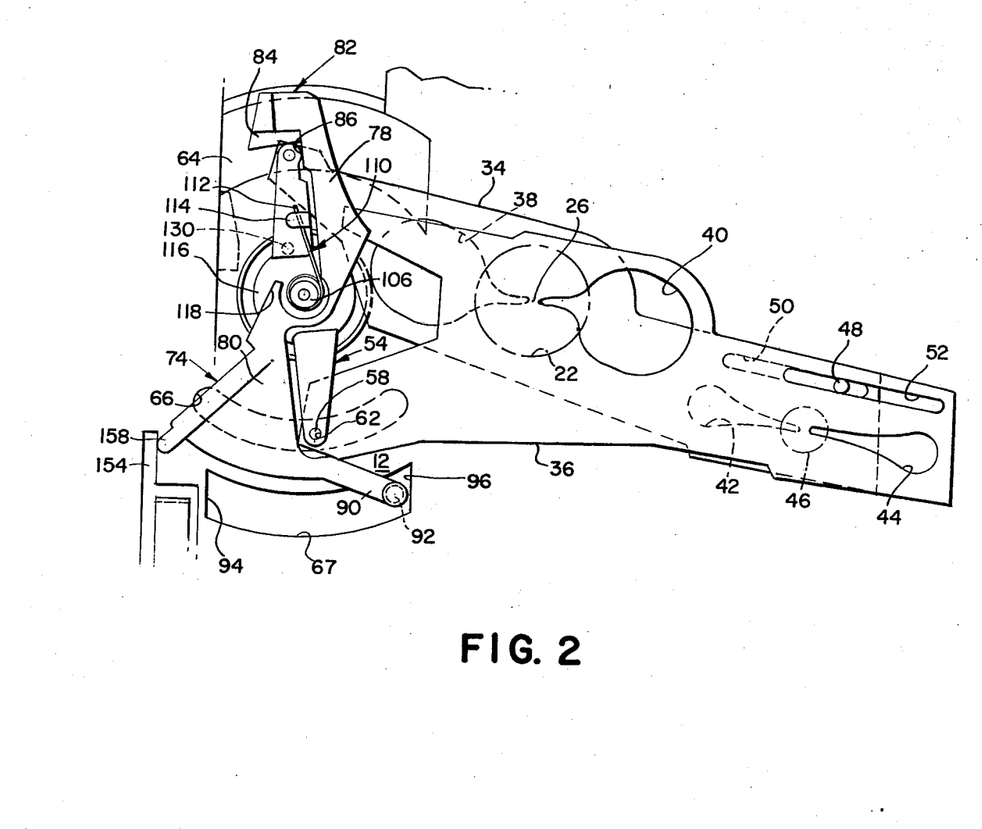
FIG. 2 is a front view of the exposure control system of this invention in a scene light blocking mode.

Referring now to FIG. 1, it can be seen that the exposure control system of this invention is disposed within an exposure housing 10 comprising a baseblock casting 12 selectively machined to support the components of the exposure mechanism. Surrounding the front and top of the casting 12, there may be provided a cover 15 which includes at least one opening through which protrudes a manually adjustable focus bezel 16. Intermediate the baseblock casting 12 and the front cover 16 there is provided a lens housing casting 14, the central portion of which includes a light entering exposure opening 22 which defines the maximum available exposure aperture for the system as shown in FIG. 2.

Figure 3:
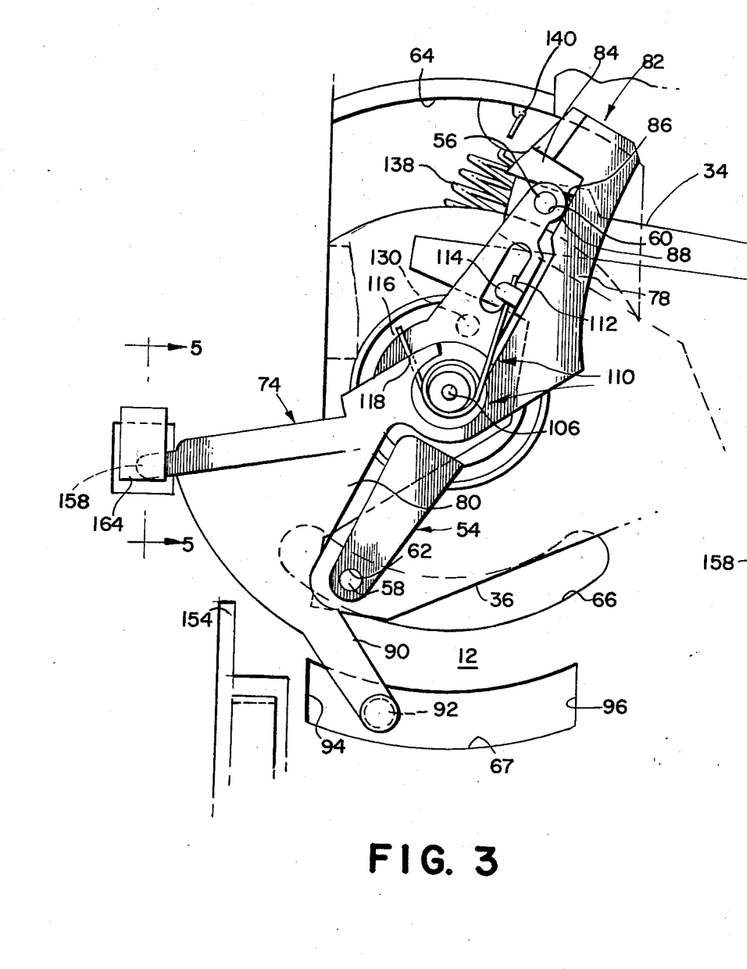
FIG. 3 is a partial front view of the exposure control system of FIG. 2 in a scene light unblocking mode.

An objective or taking lens 20 is provided in overlying relation to the light entering opening 22 wherein the objective lens 20 may comprise a plurality of elements retained in predetermined spaced relation by a cylindrical lens mount assembly 24 which is externally threaded for toothed engagement with the internally threaded focus bezel 16. Bezel 16 is made rotatable with respect to the lens housing casting 14 and front cover 15 to provide translational movement of the element of lens 20 along a central optical axis 26 of the optical path of the housing 10. As is readily apparent, the center optical axis 26 of the optical path is illustrated as being normal to the plane of the drawings in FIGS. 2–4. The rotation of focus bezel 16 may be carried out by manual rotation to provide displacement of the elements of objective lens 20 for focusing of image carrying rays through the light entering exposure opening 22 to a rearwardly positioned film plane 28 by way of a reflecting mirror 30 when the system is embodied in a suitable film exposure chamber 32. Immediately behind the objective lens 20 in light entering exposure opening 22 there are supported two overlapping shutter blade elements 34 and 36 which will be subsequently described in greater detail herein. Extending from the top of the housing 10 is a shutter release button, not shown, the depression of which causes the commencement of an exposure cycle.

A pair of scene light admitting primary apertures 38 and 40 are provided respectively in the blade elements 34 and 36 to collectively define a progressive variation of effective aperture openings in accordance with longitudinal and lateral displacement of one blade element with respect to the other blade element in a manner fully described in a U.S. patent application entitled "Camera with Pivoting Blades" by George D. Whiteside, filed July 2, 1974, and assigned in common herewith. The apertures 38 and 40 are selectively shaped so as to overlap the light entering exposure opening 22 thereby defining a gradually varying effective aperture size as a function of the position of blades 34 and 36. Each of the blades, 34 and 36, may additionally be configured to have corresponding photocell sweep secondary apertures shown respectively at 42 and 44. Secondary apertures 42 and 44 may be configured in correspondence with the shapes of scene light admitting primary apertures 34 and 36. As is readily apparent, the secondary apertures 42 and 44 also move in correspondence with the primary apertures 34 and 36 to define a small secondary effective aperture for admitting the passage of light from the scene being photographed to a light detecting station shown generally at 46. The light detecting station 46 includes a light sensitive circuit having both a photocell and control circuit, not specifically shown, which collectively operate to terminate an exposure interval as a function of the amount of light received through the secondary effective aperture as defined by the overlapping photocell sweep apertures 42 and 44. An exposure control mechanism embodying a light detecting station of the above-described type is shown in more detail and claimed in a U.S. Patent entitled "Exposure Control System" by V. K. Eloranta, No. 3,641,889.

Projecting from the baseblock casting 12 at a location spaced laterally apart from the light entering exposure opening 22 is a pivot pin or stud 48 which pivotally and translatively engages elongate slots 50 and 52 formed in respective shutter blade elements 34 and 36. Pin 48 may be integrally formed with the baseblock casting 12 and blade elements 34 and 36 may be retained in engaging relation with respect to the pin 48 by any suitable means such as peening over the outside end of pin 48.

The opposite ends of the blade elements 34 and 36 respectively include extended portions which pivotally connect to a walking beam 54. The walking beam 54 is pivotally connected at its distal ends to the shutter blade elements 34 and 36 by respective pin member 56 and 58 which extend laterally from the walking beam 54. Pin members 56 and 58 are preferably circular in cross section and extend through respective circular openings 60 and 62 in respective blade elements 34 and 36 so as to slidably engage respective arcuate recesses 64 and 66 which are integrally formed within the baseblock casting 12. The arcuate recesses 64 and 66 operate to prohibit disengagement of the blade elements 34 and 36 from their respective pin members 56 and 58 during exposure control system operation.

An inertial member, shown generally at 74, is disposed in casting apart substantially parallel relation with respect to the walking beam 54 for selective rotation in correspondence with the walking beam in a manner to be fully discussed in the following description. The inertial member 74 is disposed for rotation with respect to the baseblock casting 12 by an elongated integral center shaft portion 76 extending laterally from the side thereof so as to define a pivot pin 72 at the outward tip thereof. The pivot pin 72 is maintained for rotation by a bearing surface 100 which is supported in fixed relation with respect to the baseblock casting 12 by a laterally extending integral extension from the baseblock castiing shown generally at 102. The opposite side of the inertial member 74 is disposed for rotation with respect to the lens housing casting 14 by an integral pin member 106 extending from a second elongated integral center shaft 104 which in turn extends laterally from the inertial member. Pin 106 is journalled for rotation by a bearing surface 108 within the lens housing casting 14.

The walking beam 54 is disposed for rotation about the identical axis as the inertia member 74 by a hollow integral center shaft portion 68 extending from one side of the walking beam 54 in journalled relation with respect to the center shaft 76. The hollow center shaft 68 includes a bore 70 at the outside end thereof which operates to journal one side of the center shaft 68 for rotation with respect to the pivot pin 72. The opposite end of the hollow integral shaft 68 rotatably engages a raised circumferential bearing surface 98 formed integral to the center shaft 76 which in cooperation with the pivot pin 72 operate to journal the walking beam 54 about the identical center axis about which the inertial member 74 is disposed for rotation.

The inertial member 74 also includes a first integral web portion 78 which extends radially outward of the center shaft 76 in substantially parallel relation to the longitudinal side of the walking beam 54 to a weighted portion, shown generally at 82, which is configured to extend into the arcuate recess 64. The inertial member 74 additionally includes a recessed portion 84 which is configured to receive the outer tip portion of the walking beam 54 and its associated pin member 56. Thus, the transverse planar wall 86 which defines the backside of the recessed portion 84 can be engaged by the forward edge 88 at the outer tip of the walking beam 54 in a manner to be subsequently described.

The inertial member 74 further includes a second web portion 80 extending radially outward of the center shaft 76 into integral connection with an arm portion 90 from which laterally extends a pin member 92 for arcuate movement within a recess 67. The maximum arcuate movement of the pin member 92 relative to the recess 67 is determined by the spaced apart transverse end wall portions 94 and 96 which may be integrally defined by the baseblock casting 12. The inertial member 74 is urged to rotate in a counterclockwise direction as a function of walking beam 54 rotation in a counterclockwise direction by means of a torsion spring 110, one end of which engages the walking beam 54 at an integral hook portion 114 extending laterally from the walking beam 54. The other end of the torsion spring 110 (as shown at 116) is connected to the inertial member 74 by virtue of its insertion through an aperture 118 in the inertia member. There is also provided a gap (as shown at A) of predetermined dimension between an integral support extension 102 from the baseblock 12 and the outer tip of the center shaft 68 so as to permit limited translation of the walking beam 54 and inertial member 74 along their center axis of rotation. The significance of allowing limited translation of the walking beam 54 and inertial member 75 in this manner will become apparent from the following discussion.

A tractive electromagnetic device in the form of a solenoid 120 is employed to displace the shutter blades 34 and 36 with respect to each oher and the baseblock casting 12. The solenoid 120 may be of conventional design carrying an internally disposed cylindrical plunger unit 122 which retracts inwardly into the body of the solenoid upon energization thereof. The solenoid plunger unit 120 is affixed to the walking beam 54 by means of an elongated vertical guideway 124 at the outward end of the plunger 122 which guideway slidably engages a pivot pin 130 extending laterally from an integral radial crank arm portion 132 of the center shaft 68. In this manner, longitudinal displacement of the plunger unit 122 will operate to rotate the walking beam 54 about its center axis of rotation so as to appropriately displace the shutter blade elements 34 and 36.

The blade elements 34 and 36 are continuously urged into positions defining the largest effective aperture over the light entry exposure opening 22 by a biasing tension spring 138. The movable end of spring 138 engages a slot 136 in a second integral radial arm portion 134 extending outwardly from the elongated shaft 68 while the stationary end of spring 138 is grounded with respect to the baseblock casting 12 by connection to a member 140 extending from the baseblock casting 12. The tension spring 138 is also obliquely angled with respect to the walking beam 54 and inertial member 74 center axis of rotation so as to urge the walking beam and inertial member to translate along their center axis; the extent of such translation being determined by the leading edge of the shaft 104 abutting against the lens housing casting 14 as shown at 57. With the spring connection herein described, the exposure control mechanism of this invention is biased into a normally opened orientation and the shutter blade elements 34 and 36 are drawn to their closed position only while solenoid 120 is energized. Consequently, energization of the solenoid 120 prevents the shutter blades 34 and 36 from moving toward their maximum aperture opening under the urging of spring 138. However, as should be readily understood, the exposure control mechanism of this invention would be equally applicable to photographic systems where the blades 34 and 36 are spring biased in a normally closed position.

The exposure control system is herein described in relation to a photographic camera of the non-single lens reflex type although the intended scope of the invention is by no means so limited and cameras of the well known reflex type as described in U.S. Pat. No. 3,672,281 entitled "Reflex Camera" by E. H. Land may be equally suitable for embodying the exposure control system of this invention.

Figure 6:
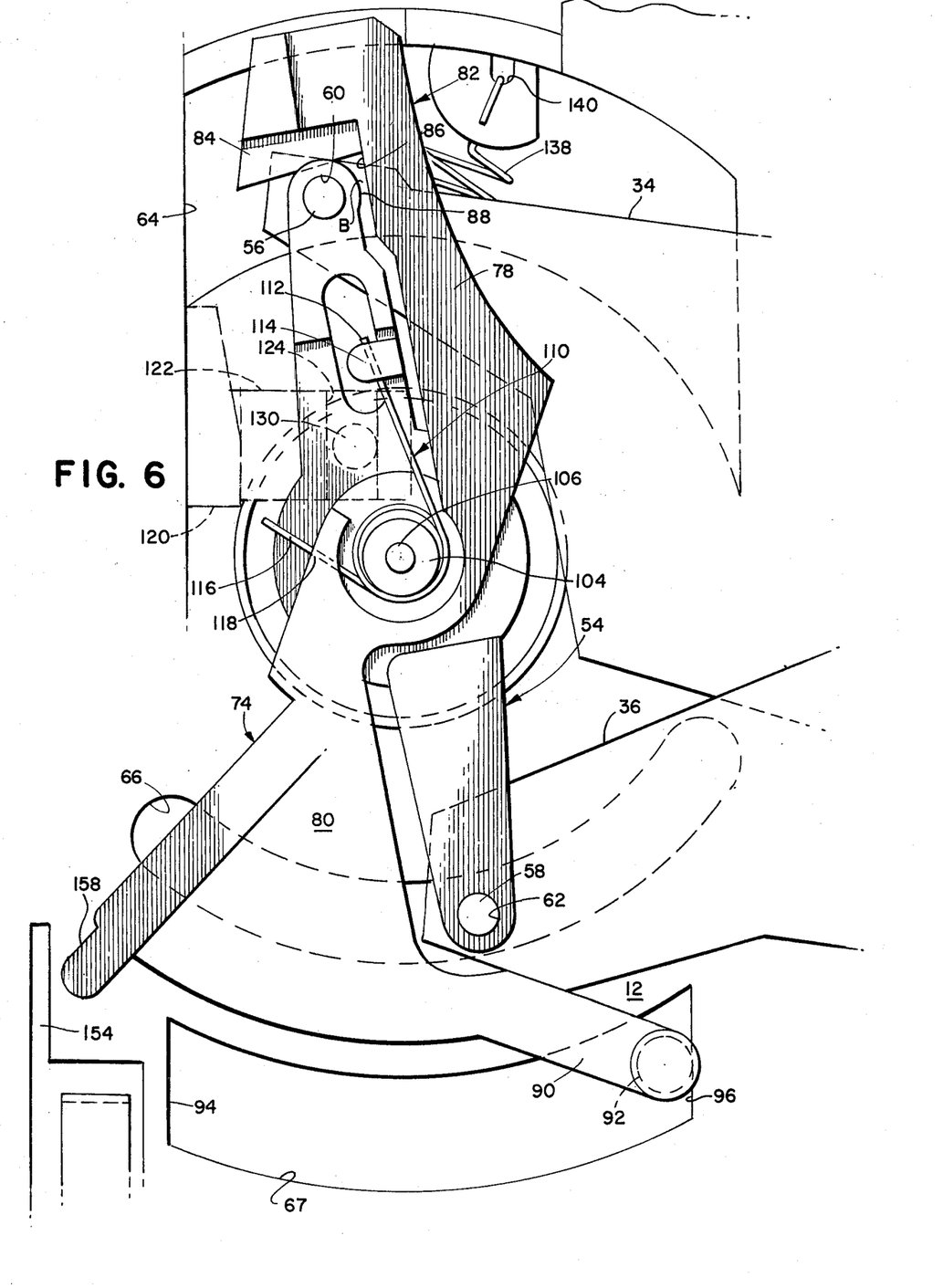
FIG. 6 is a partial front view of the exposure control system of FIG. 2 in another scene light blocking mode.
Figure 7:
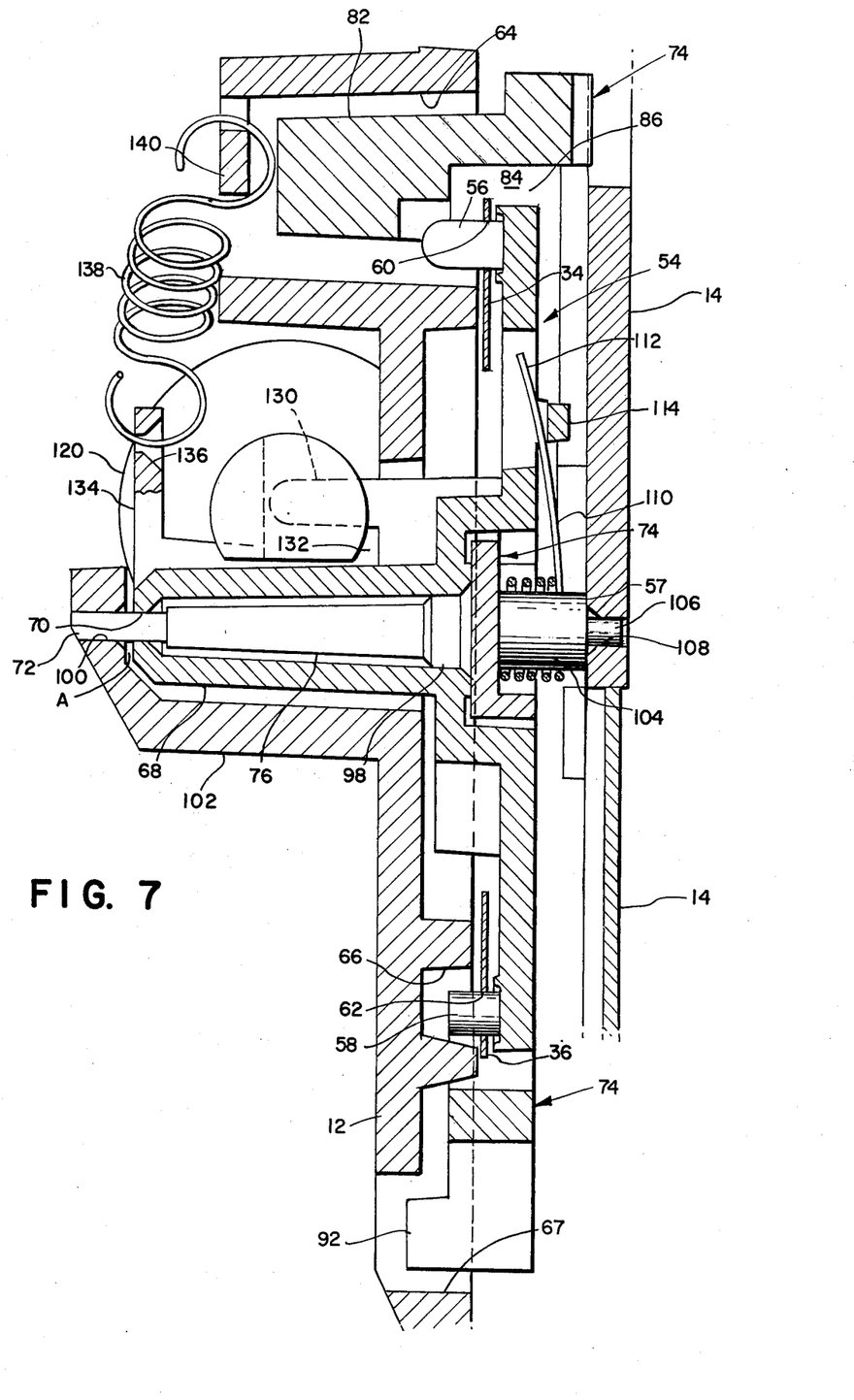
FIG. 7 is a cross-sectional view of the exposure control system of FIG. 2.

The shutter blade elements 34 and 36 are drawn and held at their closed position against the bias of spring 138 only while the solenoid 120 is energized. Therefore, it may be desirable in order to conserve on the consumption of electrical energy required to maintain the solenoid 120 in its actuated condition, to provide a latch, the front of which is shown in FIG. 2 at 154. Latch 154 is fully described in an application for U.S. Patent, Ser. No. 554,777 by B. K. Johnson and G. D. Whiteside, filed concurrently and assigned in common herewith. The latch 154 may be actuated to move into lateral engagement with a leading edge portion 158 of the inertial member 74 subsequent to the blades 34 and 36 having been drawn to the closed position by the solenoid 120 as shown in FIG. 6. Lateral translation of the latch 154 into the locus of rotation of the inertial member 74 will operate to engage the leading edge 158 of the inertial member 74 so as to inhibit full clockwise rotation of the inertial member regardless of the deactuation of the solenoid 120. As is readily apparent, such clockwise rotation would otherwise result from the outer tip of the walking beam 54 being rotated by the spring 138 in a clockwise direction into engagement with the overlapping wall 86 of the inertial member 74.

The following photographic cycle of operation respecting the exposure control system of this invention is described in regard to a camera of the non-single lens reflex type wherein the viewfinder does not have a through the lens viewing and focusing capability. The scope of invention, however, is by no means so limited and would be applicable to cameras of the single lens reflex type as previously discussed. An ambient photographic cycle is commenced upon the depression of a start button (not shown) which simultaneously effects the withdrawal of the latch member 154 as well as the deactuation of solenoid 120. Tension spring 138 thereafter operates to rotate walking beam 54 in a clockwise direction as viewed from the front of the exposure housing 15. Upon clockwise rotation, the leading edge 88 at the outer tip of the walking beam 54 engages the overlapping wall 86 of the inertial member 74 so as to rotate the inertial member 74 in a clockwise direction in concert with the walking beam 54. As is readily apparent, clockwise rotation of the walking beam 54 operates to move the shutter blade elements 34 and 36 in directions which progressively enlarge the effective aperture over the light entering exposure opening 22. The rotation of walking beam 54 also effects simultaneous translation and rotation of the shutter blade elements 34 and 36 about pivot pin 48 in a well known manner. Simultaneously, photocell sweep secondary apertures 42 and 44 define a corresponding progressively enlarging aperture opening over the photocell.

When an appropriate amount of light is received to trigger the light sensitive control circuit, solenoid 120 is again energized to rapidly close the blade elements 34 and 36 thereby terminating an exposure interval. Should the shutter blade elements 34 and 36 reach their maximum aperture defining position prior to the appropriate amount of light being received to trigger the light sensitive control circuit, the blades are then halted as a consequence of the leading edge 158 engaging a ramped surface 164 which may be formed as an integral extension from the baseblock casting 12. Sliding engagement of the leading edge 158 of the inertial member 74 along the ramped surface 164 operates to urge the inertial member 74 together with the walking beam 54 into translation along their axis of rotation against the bias of tension spring 138. In this manner, the rotational momentum of the inertial member 74 and its associated walking beam 54 may be absorbed in a gradual manner so as to stop the shutter blade movement at the maximum aperture defining position without bouncing or vibrating the shutter blade elements 34 and 36.

Figures 4, 5:
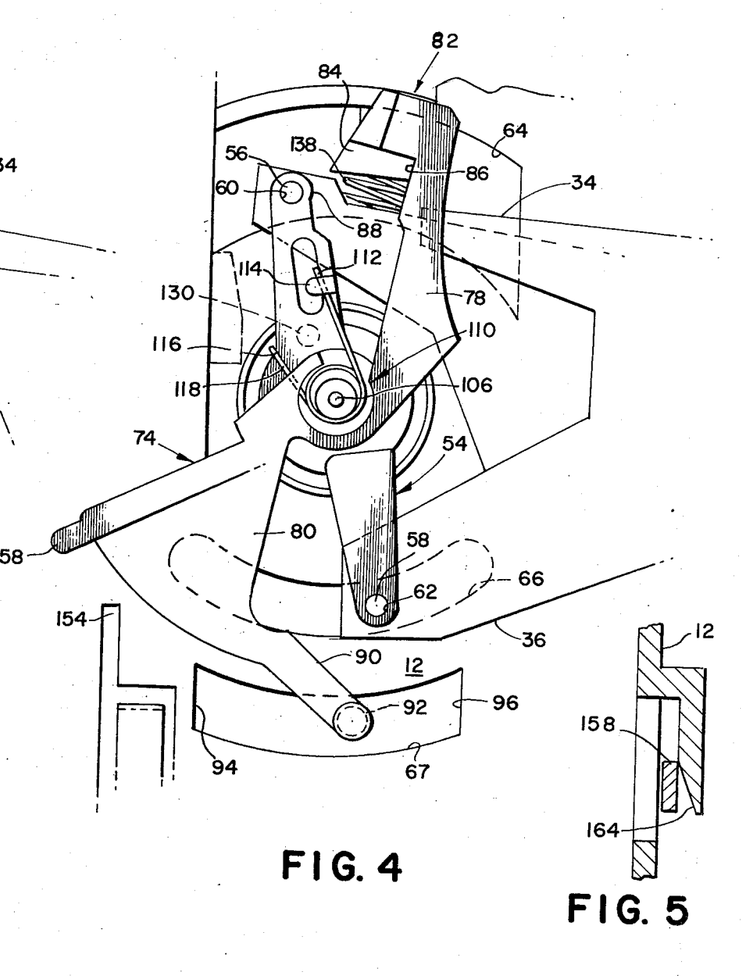
FIG. 4 is a partial front view of the exposure control system of FIG. 2 in another scene light unblocking mode.
FIG. 5 is a cross-sectional view taken across the lines 5—5 of FIG. 3.

When the appropriate amount of light is received to trigger the light sensitive control circuit, the walking beam 54 is disengaged from the inertial meember 74 and rotated in the counterclockwise direction towards the closed position as shown in FIG. 4. The inertial member 74, after being disengaged by the walking beam 54, remains stationery for a period of time during which the torquing force of the spring 110 is increased by the counterclockwise rotation of the walking beam 54. The output force characteristic of the torsion spring 110 is thus increased until adequate to overcome the static momentum of the inertial member 74, at which point the inertial member 74 is also rotated in a counterclockwise direction so as to unwind the torsion spring 110. In this manner, the inertial member 74 is returned to the position as shown in FIG. 6.

It will therefore be appreciated by referring to FIG. 6 that the aperture blade elements 34 and 36 are first rotated to their closed position entirely blocking the light entering exposure opening 22, after which thee solenoid 120 remains energized to maintain the walking beam 54 in its extreme counterclockwise position until the inertial member 74 can be returned to its extreme counterclockwise position. It will be further appreciated that the extreme counterclockwise rotation of the inertial member 74 is determined by engagement of the pin member 92 against the transverse end wall portion 96, in this manner prohibiting the returning inertial member 74 from engaging and jarring or bouncing the walking beam 54. Thus, counterclockwise rotation of the inertial member 74 is abruptly terminated while at the same time maintaining a predetermined spaced relationship as shown at B between the leading edge 88 at the outer tip of the walking beam 54 and the overlapping wall 86 of the inertial member 74.

Subsequent deactivation of the solenoid 120 in concert with simultaneous actuation of the latch 154 releases the walking beam 54 for limited clockwise rotation as imparted by the spring 138. The walking beam 54 thus rotates across the distance B into engagement with the overlapping wall 86 of the inertial member 74 so as to rotate the inertial member 74 in a clockwise direction into engagement with the latch 154. The exposure control system is thus reset to accommodate a subsequent photographic cycle as may be commenced with the depression of the start button to retract the latch 154 from engagement with the leading edge 158 of the inertial member 74. as shown in FIG. 2. Simultaneous deactuation of the solenoid 120 in concert with reactuation of the latch 154 not only limits the electrical energy which would otherwise be consumed by a continuously actuated solenoid, but also permits the walking beam 54 to rotate into engagement with the inertial member 74 so that at the commencement of a photographic cycle, no jarring or bouncing will be experienced as a result of the walking beam 54 engaging inertial member 74.

Thus, it can now be appreciated that the inertia characteristic of the member 74 is presented to the walking beam 54 when the walking beam is rotated in a clockwise direction to move the shutter blade elements 34 and 36 in the directioon of progressively enlarging effective aperture over the light entering exposure opening 22. Conversely, counterclockwise rotation of the walking beam 54 in the direction moving the shutter blade elements 34 and 36 to progressively decrease the effective aperture over the light entering exposure opening 22 disengages the walking beam 54 from the inertial member 74 so that the walking beam 54 may be rapidly rotated by the solenoid 120 without having to overcome the inertia characteristic of the member 74. The inertial member 74 is subsequently returned to its initial position as a result of the walking beam 54 increasing the output force characteristic of the torsion spring 110. In this manner, only the opening speed of the shutter blade elements 34 and 36 is influenced as a function of the inertia characteristic of the member 74 while the closing speed may be effected quickly without the inertial influence of the member 74. Utilization of the inertial member 74 in this manner permits the use of a tension spring 138 having a higher output force characteristic than would otherwise be possible while still maintaining the required rate of effective aperture opening.

Theoretically, it would be possible to utilize a liighter spring than that shown at 138 and entiirely eliminate the inertial member 74 to achieve the required rate of shutter blade opening as previously discussed, however, the use of such a light spring would make the rate at which the shutter blade elements 34 and 36 open substantially more sensitive to the influence of variations in the frictional forces between individual moving components. Thus, the use of a light spring to achieve the required rate of shutter blade movement is entirely unsatisfactory due to the difficulty in achieving a uniform rate of shutter blade movement. The exposure control arrangement of this invention overcomes this disadvantage by utilizing a substantially heavier spring 138 having a higher output force characteristic than would otherwise be possible while still achieving the desired slow rate of shutter blade movement. The inertial member 74 is selectively presented for movement in correspondence with the walking beam 54 during open movement of the shutter blade elements 34 and 34 to reduce the speed of shutter blade movement to the desired rate while automatically disengaging from the walking beam 54 to permit the fast closing of the shutter blade elements.

It will be further appreciated that the shutter blade elements 34 and 36 are moved to their maximum aperture defining position over the light entering exposure opening 22 without bouncing or jarring as a result of the leading edge 158 of the inertial member 74 being engaged by the ramped surface 164 so as to gradually absorb the rotational momentum of both the inertial member 74 and the walking beam 54. It should also be appreciated that the inertial member 74 is automatically returned to its initial position also without jarring or bouncing the walking beam 54 and its associated shutter blade elements 34 and 36. Actuation of the latch member 154 in coincidence with deactuation of the solenoid 120 permits limited rotation of the walking beam 54 into engagement with the inertial member 74 so that both the walking beam 54 and the inertial member 74 are in engaged relation at the commencement of a subsequent photographic cycle and thus ready to move in uniform correspondence without bouncing or jarring the shutter blade elements 34 and 36.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. Apparatus for a camera of the type defining a film plane and including a housing and an objective lens mounted on the housing, said apparatus comprising:
   blade means;
   means for selectively moving said blade means between a first arrangement wherein said blade means precludes scene light from reaching the film plane and a second arrangement wherein said blade means defines a maximum aperture size through which scene light may reach the film plane, said blade means serving to define a range of progressively increasing sized apertures as it moves its said first arrangement to its said second arrangement;

means for presenting a relatively high inertia characteristic to said moving means as said moving means moves said blade means from its said first arrangement toward its said second arrangement to impart a slower aperture opening movement to said blade means than would otherwise occur and for automatically presenting a relatively low inertia characteristic to said moving means as said moving means moves said blade means away from its said second arrangement toward its said first arrangement to permit aperture closing movement of said blade means substantially uninhibited by said high inertia characteristic, said inertia characteristic presenting means being operative to automatically present said relatively high inertia characteristic to said moving means whenever said moving means is again caused to move said blade means from its said first arrangement to its said second arrangement, wherein said moving means includes a rotatably mounted member arranged to be rotated in a first direction as said moving means moves said blade means from its said first arrangement to its said second arrangement and to be rotated in the opposing direction as said moving means moves said blade means from its said second arrangement to its said first arrangement, and said inertia characteristic presenting means includes an inertia mass member mounted for rotation in correspondence with said moving means member; and means for rotatably mounting said moving means member and said inertial member including concentric shaft portions extending respectively from said moving means member and said inertial member, said shaft portions being journalled for rotation with respect to each other, and additionally including support means for journalling only the outside concentric shaft portion for rotation about a select axis with respect to the camera housing.

2. The apparatus of claim 1 wherein there is included stop means for intercepting said inertial member at a predetermined location with respect to the camera housing upon the return rotation of said inertial member so as to prohibit said inertial member from engaging and bouncing said moving means member.

3. The apparatus of claim 1 including latch means for selective engagement with said inertial member in order to prohibit rotation of said inertial member from an initial position in which said inertial member can engage said moving means member and retain said moving means member in its position corresponding to said first arrangement, in this manner maintaining said blade elements in a position entirely precluding scene light from reaching the film plane regardless of the operative status of said moving means.

4. The apparatus of claim 1 wherein said outside concentric shaft portion is disposed and biased for limited axial translation along said select axis and wherein rotation of said moving means member and inertial member toward the position corresponding with said second arrangement for said blade means is interrupted in a manner operating to urge said outside concentric shaft portion against said bias in order to absorb the rotational momentum of said inertial member and moving means member in a gradual manner without bouncing said moving means member.

5. The apparatus of claim 1 wherein said support means includes a first wall member for retaining the objective lens and a second wall member connected in fixed, spaced apart relation with respect to said first wall member in a manner whereby said outside concentric shaft portion is journalled for rotation at the opposed ends thereof with respect to said first and second wall members about said select axis.

6. The apparatus of claim 1 wherein a portion of said inertial mass member is adapted for engagement by said moving means member and overlaps the locus of travel through which said moving means member rotates so as to be engaged at an initial position and rotated by said moving means member upon rotation thereof in a direction operating to move said blade elements from said first arrangement toward said second arrangement in the direction of progressively increasing sized apertures whereas rotation of said moving means member in the opposing direction to move said blade elements back toward said first arrangement operates to simultaneously disengage said moving means member from said overlapping portion of said inertial member whereby said inertial member is rotated back to its initial position by a first spring connecting said inertial member to said moving means member.

7. The apparatus of claim 6 wherein said first spring is a torsion spring, one end of which is engaged by said moving means member and the other end of which is engaged by said inertial member in a manner whereby the return movement of said moving means member toward said second arrangement operates to increase the torquing force of said torsion spring until the inertia of said inertial member is overcome so as to permit said torsion spring to return said inertial member to its initial position subsequent to said moving means member returning to the position corresponding with said first arrangment.

8. The apparatus of claim 6 wherein said outside concentric shaft portion extends laterally outward of said moving means member and includes a first pivot arm portion extending radially outward thereof and wherein said moving means additionally includes a second spring, one side of which connects to said pivot arm and the other side of which is grounded with respect to the camera housing with the longitudinal axis of said spring being predisposed in a select manner to effect a progressively increasing moment arm with respect to said select axis thus maintaining a substantially uniform torque on said beam member as said spring moves with beam rotation from said first position toward said second position.

9. The apparatus of claim 8 wherein said outside concentric shaft portion includes a second pivot arm extending radially outward therefrom together with a pivot pin extending laterally outward of said second pivot arm portion and wherein said moving means additionally includes an electromagnetic device having a selectively translatable plunger which translatively and rotatively connects to said second pivot point by means of an elongated guideway in order to rotate said second pivot pin about said select axis in a direction corresponding with said moving means member rotation toward said first arrangement.

10. The apparatus of claim 9 wherein said plunger includes a follower portion translatively engaged within a second elongated guideway in fixed relation relative to the housing, said follower portion operating to inhibit rotational movement of said plunger about its longitudinal axis of translation.

11. Apparatus for a camera of the type defining a film plane and including a housing and an objective lens mounted on the housing, said apparatus comprising:
blade means;
means for selectively moving said blade means between a first arrangement wherein said blade means precludes scene light from reaching the film plane and a second arrangement wherein said blade means defines a maximum aperture size through which scene light may reach the film plane, said blade means serving to define a range of progressively increasing sized apertures as it moves from its said first arrangement to its said second arrangement;
means for presenting a relatively high inertia characteristic to said moving means as said moving means moves said blade means from its said first arrangement toward its said second arrangement to impart a slower aperture opening movement to said blade means than would otherwise occur and for automatically presenting a relatively low inertia characteristic to said moving means as said moving means moves said blade means away from its said second arrangement toward its said first arrangement to permit an aperture closing movement of said blade means substantially uninhibited by said high inertia characteristic, said interia characteristic presenting means being operative to automatically present said relatively high inertia characteristic to said moving means whenever said moving means is again caused to move said blade means from its said first arrangement to its said second arrangement, wherein said moving means includes a member mounted for rotation and limited displacement in a first direction as said moving means moves said blade means from its said first arrangement to its said second arrangement and to be rotated in a second direction as said moving means moves said blade means from its said second arrangement to its said first arrangement, and said interia characteristic presenting means includes an inertial mass member mounted for rotation in correspondence with said moving means member;
means for biasing said moving means member against one of the limits of displacement along its axis of rotation; and
means for interrupting rotation of said inertial member and moving means member upon reaching the position corresponding to said second arrangement in a manner operating to urge said interial member against the bias of said biasing means to absorb the rotational momentum of said inertial member and moving means member in a gradual manner without bouncing said moving means member.

12. The apparatus of claim 11 wherein said moving means and biasing means include a unitary spring one side of which connects at said moving means member and the other side of which is grounded with respect to the camera housing with the longitudinal axis of said spring being predisposed in a select manner to urge said moving means member toward the position corresponding with said second arrangment while at the same time biasing said moving means member against one of the limits of displacement along its axis of rotation.

13. The apparatus of claim 11 wherein there is included stop means for intercepting said inertial member at a predetermined location with respect to the camera housing upon the return of rotation of said inertial member so as to prohibit said inertial member from engaging and bouncing said moving means member.

14. The apparatus of claim 11 including latch means for selective engagement with said inertial member in order to prohibit rotation of said inertial member from an initial position in which said inertial member can engage said moving means member and retain said moving means in its position corresponding with said first arrangement, in this manner maintaining said blade elements in a position entirely precluding scene light from reaching the film plane regardless of the operative status of said moving means.

15. The apparatus of claim 11 wherein a portion of said inertial mass member is adapted for engagement by said moving means member and overlaps the locus of travel through which said moving means member rotates so as to be engaged at an initial position and rotated by said moving means member upon rotation thereof in a direction operating to move said blade elements from said first arrangement toward said second arrangement in the direction of progressively increasing sized apertures whereas rotation of said moving means member in the opposing direction to move said blade elements back toward said first arrangement operates to simultaneously disengage said moving means member from said overlapping portion of said inertial member whereby said inertial member is rotated back to its initial position by a spring connecting said inertial member to said moving means member.

16. The apparatus of claim 11 including latch means for selective engagement with said inertial member in order to prohibit substantial movement of said inertial member from its initial position in which said inertial member can engage said moving means member and retain said moving means member in its position corresponding with said first arrangement, in this manner maintaining said blade elements in a position entirely precluding scene light from reaching the film plane regardless of the operative status of said moving means.

17. Apparatus for a camera of the type defining a film plane and including a housing and an objective lens mounted on the housing, said apparatus comprising:
blade means;
means for selectively moving said blade means between a first arrangement wherein said blade means precludes scene light from reaching the film plane and a second arrangement wherein said blade means defines a maximum aperture size through which scene light may reach the film plane, said blade means serving to define a range of progressively increasing sized apertures as it moves from its said first arrangement to its said second arrangement;
means for presenting a relatively high inertia characteristic to said moving means as said moving means moves said blade means from its said first arrangement toward its said second arrangement to impart a slower aperture opening movement to said blade means than would otherwise occur and for automatically presenting a relatively low inertia characteristic to said moving means as said moving means moves said blade means away from its said second arrangement toward its said first arrangement to permit an aperture closing movement of said blade means substantially uninhibited by said high inertia characteristic, said inertia characteristic presenting means being operative to automatically present said relatively high inertia characteristic to said moving means whenever said moving means is again caused to move said blade means from its said first arrangement to its said second arrangement, wherein said moving means includes a displaceably mounted member arranged to be displaced in a first direction as said moving means moves said blade means from its said first arrangement to its said second arrangement and to be displaced in a second direction as said moving means moves said blade means from its said second arrangement to its said first arrangement, and said inertia characteristic presenting means includes an inertial member mounted for displacement from an initial position in correspondence with said moving means member as said moving means moves in said first direction, said moving means member drivingly engaging said inertial member as it moves in said first direction and moving away from said inertial member as it moves in said second direction;

means for causing said interial member to return to its said initial position subsequent to said moving means member returning to its position corresponding with said first arrangement; and stop means for intercepting said inertial member upon the return of said inertial member to said initial position so as to prohibit said inertial member from engaging and bouncing said moving means member.

18. The apparatus of claim 17 wherein a portion of said inertial member is adapted for engagement by said moving means member and overlaps the locus of travel through which said moving means member is displaced so as to be engaged at said initial position and rotated by said moving means member upon rotation thereof in a direction operating to move said blade elements from said first arrangement toward said second arrangement in the direction of progressively increasing sized apertures whereas rotation of said moving means member in the opposing direction to move said blade elements back toward said first arrangement operates to simultaneously disengage said moving means member from said overlapping portion of said inertial member whereby said inertial member is displaced back to its initial position by a spring connecting said inertial member to said moving means member.

19. Apparatus for a camera of the type defining a film plane and including a housing and an objective lens mounted on the housing, said apparatus comprising;

blade means means for selectively moving said blade means between a first arrangement wherein said blade means precludes scene light from reaching the film plane and a second arrangement wherein said blade means defines a maximum aperture size through which scene light may reach the film plane, said blade means serving to define a range of progressively increasing sized apertures as it moves from its said first arrangement to its said second arrangement;

means for presenting a relatively high inertia characteristic to said moving means as said moving means moves said blade means from its said first arrangement toward its said second arrangement to impart a slower aperture opening movement to said blade means than would otherwise occur and for automatically presenting a relatively low inertia characteristic to said moving means as said moving means moves said blade means away from its said second arrangement toward its said first arrangement to permit an aperture closing movement of said blade means substantially uninhibited by said high inertia characteristic, said inertia characteristic presenting means being operative to automatically present said relatively high inertia characteristic to said moving means whenever said moving means is again caused to move said blade means from its said first arrangement to its said second arrangement wherein said moving means includes a displacably mounted member arranged to be displaced in a first direction as said moving means moves said blade means from its said first arrangement to its said second arrangement and to be displaced in a second direction as said moving means moves said blade means from its said second arrangement to its said first arrangement, and said inertia characteristic presenting means includes an inertial member mounted for displacement from an initial position in correspondence with said first displacably mounted member, and including a portion thereof engageable by said moving means member; and latch means for selective engagement with said inertial member in order to prohibit substantial displacement of said inertial member from said initial position whereby said inertial member can engage said moving means member and retain said moving means member in its position corresponding to said first arrangement in this manner maintaining said blade elements in a position entirely precluding scene light from reaching the film plane regardless of the operative status of said moving means.

* * * * *